Sept. 16, 1941.    T. JORGENSEN    2,255,976
TROLLING FISHHOOK
Filed May 22, 1939
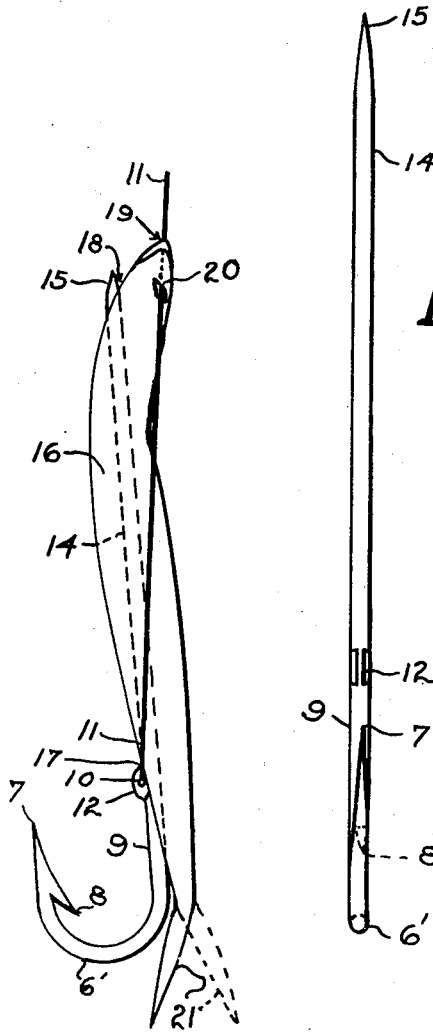
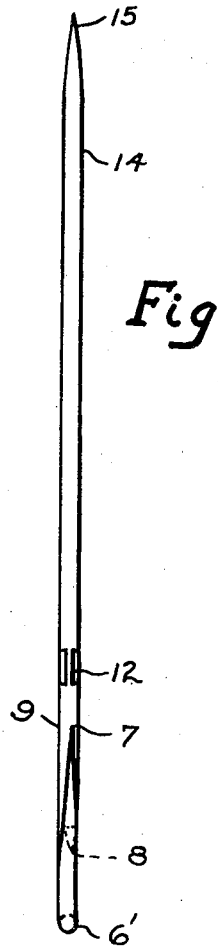
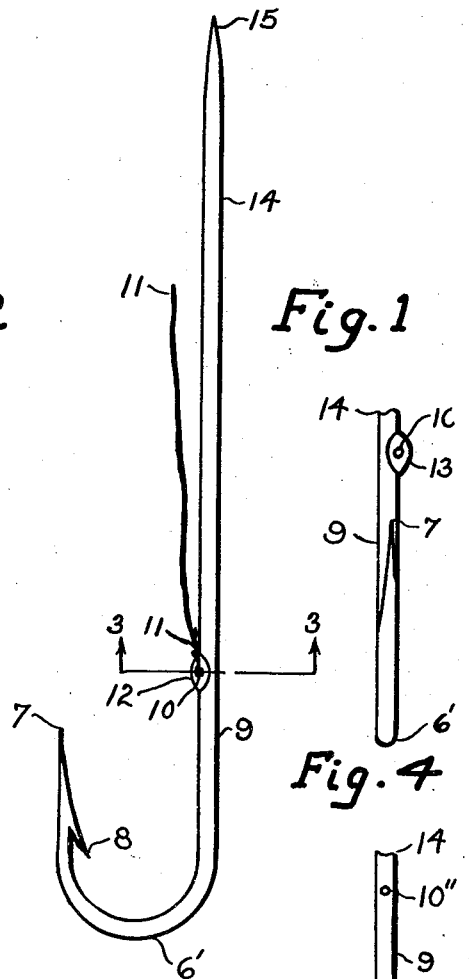
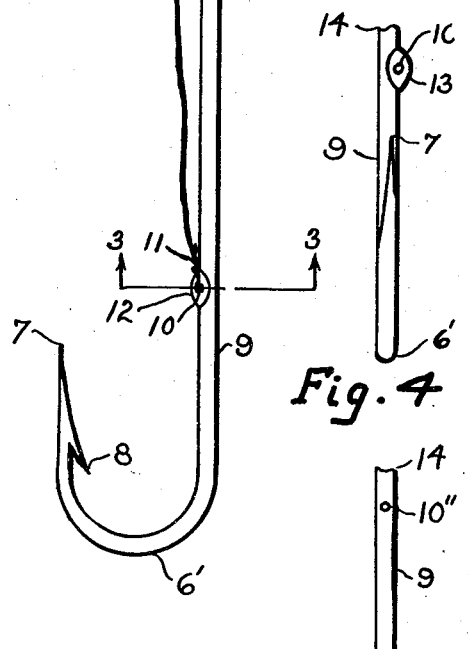
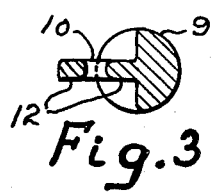
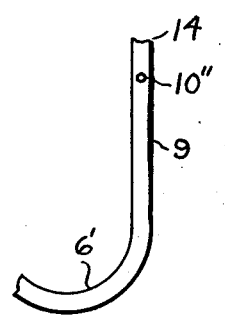
INVENTOR.
THORALF JORGENSEN
BY
ATTORNEYS.

Patented Sept. 16, 1941

2,255,976

UNITED STATES PATENT OFFICE 2,255,976

TROLLING FISHHOOK

Thoralf Jorgensen, Vashon, Wash.

Application May 22, 1939, Serial No. 274,945

1 Claim. (Cl. 43—40)

This invention relates to trolling hooks and particularly to such hooks for maintaining a bait fish in position for attracting live fish to be caught.

In the practice of trolling for large fish with relatively small fish for bait, much difficulty has been encountered in attempting to maintain the bait in attractive positions. In some cases the bait has been threaded directly upon the hook, but in this position it does not appear natural. In other cases the bait has been attached to the hook so that a large portion of the bait extends behind the same and it is then frequently bitten off by fish without them being caught. In other cases the head of the bait has been tied by cords or wire to the end of the leader above the hook, but this does not give the desired effect and is very difficult to accomplish when the operator's hands are numb from cold as frequently is the case in sea fishing.

It is, therefore, an object of this invention to provide a hook with a straight prong extended above the eye of the hook for insertion lengthwise in a bait fish for sustaining the same in suitable positions with the hook.

A further object is to provide a hook with an eye at the top of the shank and adjacent the base of the prong, for the attachment of a leader to the trolling line for drawing the leader through the jaws of the bait fish to hold the mouth thereof closed and to limit the prong from entering the body of the bait below such prong and eye, and also for drawing such bait through the water for trolling.

A particular object is to provide a hook with an eye at the top of the shank for attaching a leader line, and a prong extending above the eye for piercing a central portion of the bait to maintain such portion in alinement with the leader and also for sustaining the head of the bait bent to one side to cause a wavering movement of such bait when drawn through the water to attract live fishes. The preferred forms of the hook embodying the inventive idea with the foregoing and other objects to be hereinafter stated, I have illustratively exemplified by the accompanying and related drawing of which:

Figure 1, is a side elevation of the hook with the prong projected above the shank and the eye at the junction thereof through a web extended forward from the shank. Figure 2, is a front elevation of Fig. 1. Figure 3, is a cross section of Fig. 1, taken on line 3—3 of Fig. 1. Figure 4, is a second embodiment of the invention showing a front elevation in fragmentary detail of the shank and prong and the eye through a web extended from one side of the shank. Figure 5, is a third embodiment of the invention showing a side elevation of a fragmentary detail of the shank and prong with the eye directly through the shank. Figure 6, is a diagrammatic view illustrating a method for mounting a bait fish upon the prong with the head of the bait turned to one side and the mouth held closed by the leader, and the tail of the bait free to waver.

The invention and structures are more fully described by reference to numerals which refer to like parts on the different figures.

Numeral 6', indicates the end of the lower loop of the hook. 7 indicates end of the point thereof, with a barb 8; and 9 indicates a rear shank 9.

Numeral 10 on Figs. 1, 2, 3, and 6 indicate the small hole or eye for attaching the front end of a leader 11. This leader is ordinarily formed of steel wire for large fish and salmon. It is of any desired length and the rear end is connected to a suitable trolling line for drawing the bait through the water by a boat in the usual manner. A flattened portion or web 12 as shown in Figs. 1, 2, 3, and 6 may be provided for the eye 10. This web may be extended forward from the top of the shank 9, and in this position serves as a fulcrum when pulled by the leader, for maintaining the point of the hook in the mouth of such live fish as have a tendency for freeing themselves from hooks.

A prong 14, is projected upon or above the shank and eye. The tip of the prong is drawn to a sharp point as 15, for piercing through the side of a fish and lengthwise through the major portion of the body thereof for holding such portion parallel with the prong. This point is also important for piercing side wise through the bones of the neck of the bait fish for maintaining the head thereof on an angle from the body to cause a wavering movement when drawn through the water.

In use, the fisherman, when attaching a bait, first inserts the point of the hook 7, through the lower jaw of the herring or other bait fish indicated as 16 from the lower side as at 19. He next inserts the point 7, through the upper jaw, from the under side thereof a short distance behind the opening through the lower jaw and brings the point of the hook out through the upper jaw, at any suitable location as at 20. Next he draws the prong and leader onward through both jaws and toward the tail of the fish until the tip of the prong is opposite the lower end of the major portion of the bait as at 17. Then he projects the prong into the side of the bait and up through the body of the same till the tip 15, reaches the neck of the bait as at 18, whereupon he bends the head of the bait to one side and further projects the tip 15 crosswise through the neck and bones thereof for holding the head on angle with the body. The body of the bait is thus maintained parallel with the prong and the head at an angle thereto to cause the bait to waver when drawn along by the leader. When the tip 15, reaches through the neck the eye will have abutted against the side of the fish at the location 17, and the leader will be extended forward therefrom along one side of the fish and through the upper and lower jaw thereby holding the jaws together and the mouth closed when the leader draws the bait and hook along by connection with the eye. The tail portion 21, of the bait behind the eye is left free to waver in opposite directions from movements of the head and body portion, to simulate a live fish when used for trolling.

In some cases, particularly when using a bait with a flat body it is preferable to adopt the structure shown in Figure 4. Here the web 13, is extended laterally from the shank, and when so used, web 13, abuts against the side of the bait fish and serves to maintain the point of the hook at right angles to the side of the bait, in desirable position for hooking some varieties of fish when the bait is drawn forward by the leader. In still other cases it is preferred to use the structure indicated in Figure 5, with the eye 10'' located directly through the body of the shank adjacent the base of the prong. This form obviates the webs and is cheaper in construction and where relatively small bodied baits are used it may be preferred.

It will be understood that in all forms or structure the object is to provide an eye at the base of the prong or at the top of the shank whereby the prong is retained in the body of the bait and the leader is located through the jaws of the bait fish for holding the mouth closed.

Having described my invention I claim as new:

A salmon trolling hook comprising a curved barbed hook portion, a shank portion extending therefrom, a prong portion extending from and integral with said shank portion and terminating in a point and an eye pressed from the shank portion so that the eye opening will lie in the plane of the shank and prong portions.

THORALF JORGENSEN.